(12) United States Patent
Sawada et al.

(10) Patent No.: US 8,094,593 B2
(45) Date of Patent: Jan. 10, 2012

(54) COMMUNICATION APPARATUS, COMMUNICATION PROGRAM, AND COMMUNICATION METHOD

(75) Inventors: Kimihiro Sawada, Kawasaki (JP); Takashi Ueki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 810 days.

(21) Appl. No.: 12/119,946

(22) Filed: May 13, 2008

(65) Prior Publication Data

US 2008/0212511 A1    Sep. 4, 2008

Related U.S. Application Data

(63) Continuation of application No. PCT/JP2005/021530, filed on Nov. 24, 2005.

(51) Int. Cl.
*H04B 7/00* (2006.01)
(52) U.S. Cl. .................................................... 370/310
(58) Field of Classification Search .......... 370/310–349, 370/431–463
See application file for complete search history.

(56) References Cited

U.S. PATENT DOCUMENTS

| | | | | |
|---|---|---|---|---|
| 7,016,322 | B1 * | 3/2006 | Moon et al. | 370/331 |
| 2002/0144273 | A1 * | 10/2002 | Reto | 725/86 |
| 2002/0147777 | A1 * | 10/2002 | Hackbarth et al. | 709/205 |
| 2004/0070627 | A1 * | 4/2004 | Shahine et al. | 345/794 |
| 2005/0135318 | A1 * | 6/2005 | Walton et al. | 370/338 |
| 2009/0150488 | A1 * | 6/2009 | Martin-Cocher et al. | 709/204 |

FOREIGN PATENT DOCUMENTS

| | | |
|---|---|---|
| JP | 63-72960 U | 5/1988 |
| JP | 2001-103132 A | 4/2001 |
| JP | 2001-268257 A | 9/2001 |
| JP | 2003-198708 A | 7/2003 |
| JP | 2004-357142 A | 12/2004 |

OTHER PUBLICATIONS

International Search Report of PCT/JP2005/021530, date of mailing Dec. 27, 2005.

* cited by examiner

*Primary Examiner* — Chi Pham
*Assistant Examiner* — Fan Ng
(74) *Attorney, Agent, or Firm* — Westerman, Hattori, Daniels & Adrian, LLP (57) ABSTRACT

A communication apparatus of the present invention used for communicating with an external communication device is provided with a memory section to store a correspondence table associating users of external communication devices with contact addresses for contacting the users via the communication apparatus; a communication section to transmit data destined for the contact addresses and/or receive data originated from the contact addresses; a retrieval section that retrieves, from the users in the correspondence table, users with an elapsed period longer than a threshold value, the elapsed period being a period elapsed after a final communication destined for or originated from contact addresses of the retrieved users; a display section to display a list of the retrieved users; and a communication control section that, upon selection of a user from the displayed list, causes the communication section to perform a communication destined for the contact address associated with the selected user.

5 Claims, 9 Drawing Sheets

COMMUNICATION APPARATUS, COMMUNICATION PROGRAM, AND COMMUNICATION METHOD

TECHNICAL FIELD

The present invention relates to a communication apparatus that carries out communication based on contact address, a communication program that is implemented in the communication apparatus and thereby causes the communication apparatus to carry out communication based on contact address, and a communication method by the communication apparatus.

BACKGROUND ART

Conventionally, exchange of calls and electronic mails using a phone and a personal computer or the like has facilitated and enlarged communication between family members, or friends. By using communication tools such as a phone and an electronic mail, a user can contact his or her friend or family easily and conveniently even when they are far away from the user.

Further, with recent trend in which phone charges are significantly reduced and increasing number of people own a portable phone terminal or Personal Digital Assistant (PDA) exclusively for themselves, communication using such a portable device has become handy and increasingly important. Under the circumstances, many users exchange an electronic mail even with their friends who are not in familiar terms with the users. Consequently, more communication partners are registered in an address book of such a communication apparatus than a hand-written address book. Moreover, since data registered in the address book is managed in the order of partner names, a partner with whom a user has not contacted for a long time and a partner with whom the user contacts frequently are not sorted out, which makes it hard to find instantly the contact address of a partner whom the user wishes to contact.

In this regard, Patent Document 1 describes a technique that communication partners in an address book are listed in the order of communication frequency, while Patent Document 2 describes a technique that a communication partner whom a user has not contacted for a long time is deleted from an address book. By using those techniques, it is possible to select a communication partner whom the user contacts frequently, thereby improving operability of an apparatus.

Patent Document 1: Japanese Patent Application Publication No. 2003-198708
Patent Document 2: Japanese Patent Application Publication No. 2004-357142

However, though the technique described in Patent Document 1 facilitates a call to a communication partner with a high frequency, that technique does not make a user aware of a communication partner whom the user does not intend to, but forgets to call. On the other hand, Patent Document 2 describes displaying a list of communication partners whom a user has not contacted for a long time when allowing deletion of registered data, which makes the user aware of a communication partner whom the user forgets to contact by confirming the displayed list. However, even though the user finds his or her important communication partner by confirming one by one deletion candidates registered in the address book, it is cumbersome for the user to search the contact address of the important partner from a large amount of data registered in the address book to contact the partner according to the contact address. Consequently, the user may postpone searching the address and eventually may forget to contact the partner. If the user postpones contacting a partner as it is cumbersome, the user may be estranged from the partner, which is contrary to increasing importance of communication by using the communication apparatus.

In view of the above circumstances, it is an object of the present invention to provide a communication apparatus that is capable of avoiding situation in which a user is estranged from a communication partner, a communication program storage medium, and a communication method thereof.

DISCLOSURE OF THE INVENTION

A communication apparatus of the present invention achieving the above object has a memory section that stores a correspondence table associating users of external communication apparatuses with contact addresses for contacting the users via the communication apparatus; a communication section that transmits data destined for the contact addresses and/or receives data originated from the contact addresses; a retrieval section that retrieves, from the users in the correspondence table stored in the memory section, users with an elapsed period longer than a threshold value, the elapsed period being a period elapsed after a final communication destined for or originated from contact addresses of the retrieved users; a display section that displays a list of the users retrieved by the retrieval section; and a communication control section that, in response to operation of selecting a user from the list displayed by the display section, causes the communication section to perform a communication destined for the contact address associated with the selected user and registered in the correspondence table.

In the communication apparatus according to the present invention, based on a period elapsed after a final communication date and time via the communication apparatus, users with an elapsed period longer than the predetermined threshold value are retrieved from the users in the correspondence table that is previously stored. The list of the retrieved users is displayed. In response to selection of a user in the list, the contact address of the selected user is automatically acquired to perform communication with the contact address. A user who owns the communication apparatus is able to aware that he or she has forgotten to contact the user in the list by confirming the list and to easily contact the user just by selecting the user in the list without referring to an address book for the contact address. Thus, it is possible to avoid the situation in which contacting the user is postponed as it is cumbersome and eventually forgotten.

Further, in the communication apparatus of the present invention, it is preferable that the display section display the list of the users retrieved by the retrieval section in the order according to the elapsed period, and the communication apparatus further has a switching section that switches, according to instruction, arrangement of the users in the list between ascending order and descending order.

According to the preferable feature of the communication apparatus of the present invention, in the case of contacting the users in the list in descending order of the period for which communication is not performed, the arrangement of the users in the list may be switched to the descending order. Alternatively, in the case of confirming a user newly added to the list, the arrangement of the users in the list may be switched to the increasing order of the period for which communication is not performed. In this way, it is possible to enhance operability of the communication apparatus.

It is also preferable in the communication apparatus of the present invention that the retrieval section retrieves users with the elapsed period longer than the threshold value at every predetermined timing, and the display section displays a list including a new user, when the new user is retrieved who is other than the users previously retrieved and displayed in the display section.

As a list including a newly added user is displayed only when the new user is retrieved who is other than the users previously retrieved and displayed in the display section, it is possible to eliminate the need to confirm the list many times.

Further preferably, the communication apparatus of the present invention may have a frequency acquiring section that acquires the number of communications for each of the users in the correspondence table, which are performed by the communication section and destined for or originated from the contact address associated with the user, and the retrieval section may change the threshold value to a value smaller as the acquired number of communications is larger, and retrieve a user with the elapsed period longer than the changed threshold value.

Accordingly, it is possible to add a user with frequent communications to the list before the period after the final communication does not become long.

A communication program, according to another aspect of the present invention achieving the above object, which is implemented in a program-executable communication apparatus and causes the communication apparatus to construct: a memory section that stores a correspondence table associating users of external communication devices with contact addresses for contacting the users via the communication apparatus; a communication section that transmits data destined for the contact addresses and/or receives data originated from the contact addresses; a retrieval section that retrieves, from the users in the correspondence table stored in the memory section, users with an elapsed period longer than a threshold value, the elapsed period being a period elapsed after a final communication destined for or originated from contact addresses of the retrieved users; a display section that displays a list of the users retrieved by the retrieval section; and a communication control section that, in response to operation of selecting a user from the list displayed by the display section, causes the communication section to perform a communication destined for the contact address associated with the selected user in the correspondence table.

By the communication program of the present invention, it is possible to make aware of a communication partner who has not been contacted for a predetermined period and to easily contact the communication partner without taking much time and labor. Thus, it is possible to prevent being estranged from the communication partner.

Here, only the basic feature of communication program storage medium is described to avoid redundancy. However, it should be noted that the communication program according to the present invention is not limited to that feature and includes other features corresponding to the additional features of the communication apparatus described above.

In addition, as to the elements constructed by the communication program, a single element may be constructed by a single module of the program, a single element may be constructed by two or more modules of communication program, or two or more elements may be constructed by a single module of the program. Further, the elements may implement their functions by themselves, or may cause other program or a module of the program incorporated in a portable terminal to implement the functions by the instruction.

Further, a communication method of a communication apparatus according to the present invention achieving the above object, which transmits and/or receives data, includes the steps of: storing a correspondence table associating users of communication devices with contact addresses for contacting the users via the communication apparatus; retrieving, from the users in the correspondence table stored in the memory section, users with an elapsed period longer than a threshold value, the elapsed period being a period elapsed after a final communication destined for or originated from contact addresses of the retrieved users; displaying a list of the retrieved users; and in response to operation of selecting a user from the list displayed by the display section, performing a communication destined for the contact address associated with the selected user in the correspondence table.

As mentioned above, the communication method of the present invention is capable of surely preventing a communication partner from being estranged.

The present invention makes a user of the communication apparatus aware of a communication partner whom the user has not contacted for a certain period and enables the user to easily contact the partner without taking a lot of time and labor, thereby avoiding a situation in which the user may be estranged from a communication partner.

BEST MODE FOR CARRYING OUT THE INVENTION

Hereafter, an embodiment of the present invention will be described referring to the attached drawings.

Figure 1:
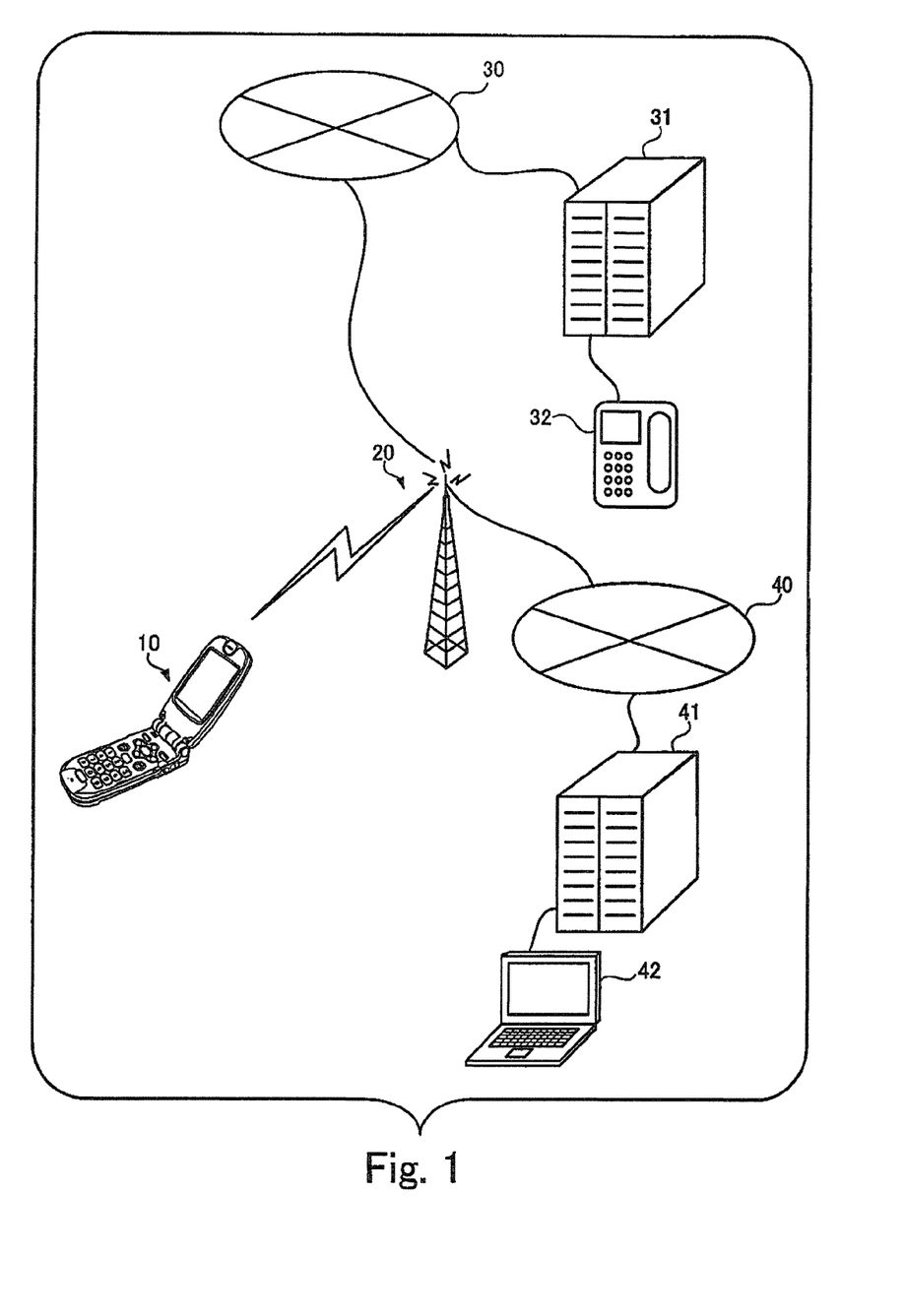
FIG. 1 is a schematic view of a communication system in which an embodiment of the present invention is employed.

FIG. 1 is a schematic view of a communication system in which the embodiment of the present invention is employed.

FIG. 1 shows a portable phone terminal 10, a base station 20, a fixed telephone line 30, an exchange 31, a fixed telephone terminal 32, a network line 40, a mail server 41, and a personal computer 42.

The portable phone terminal 10 is one embodiment of the communication apparatus according to the present invention. The portable phone terminal 10 exchanges with an external device voice data having digital voice and an email based on telephone numbers and email addresses. For example, when the portable phone terminal 10 transmits voice data destined for a telephone number of the fixed telephone terminal 32, the voice data is sent to the base station 20 which in turn transmits the voice data to the exchange 31 through the telephone line 30. Subsequently, the exchange 31 transmits the voice data to the fixed telephone terminal 32 having a destination telephone number assigned thereto. On the other hand, when an email destined for an email address owned by a user is transmitted from the portable phone terminal 10, the email is received by the base station 20, then sent to the mail server 41 through the network line 40, and temporarily stored in the mail server 41. If the user of the personal computer 42 inquires, using the personal computer 42, for any email destined for the user's email address, the mail server 41 transmits the email destined for the inquired email address to the personal computer 42. On the other hand, if data of various types destined for the telephone number and email address owned by the portable telephone terminal 10 are transmitted from the fixed telephone line 32 and the personal computer 42, the data is received by the base station 20 through the telephone line 30 and network line 40. Subsequently, data is received by the portable telephone terminal 10 by way of a mail server (not shown) for a portable telephone of the base station 20.

Actually, numerous portable telephone terminals, fixed telephone terminals, and personal computers are connected to the base station 20, exchange 31 and mail server 41, while numerous base stations 20, exchanges 31 and mail servers 41 are connected to the telephone line 30 and network line 40. However, FIG. 1 shows minimum elements required for illustrating the present invention in order to simplify the drawing.

Figure 2:
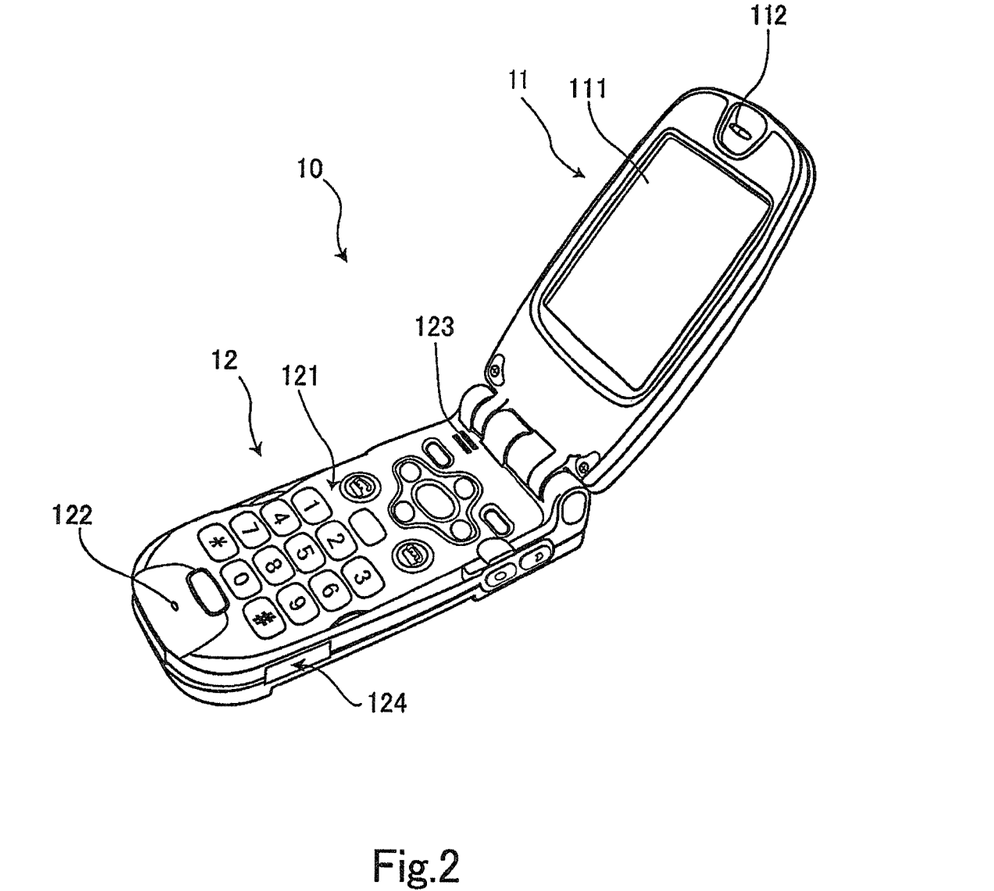
FIG. 2 is an external perspective view of a portable phone terminal.
Figure 3:
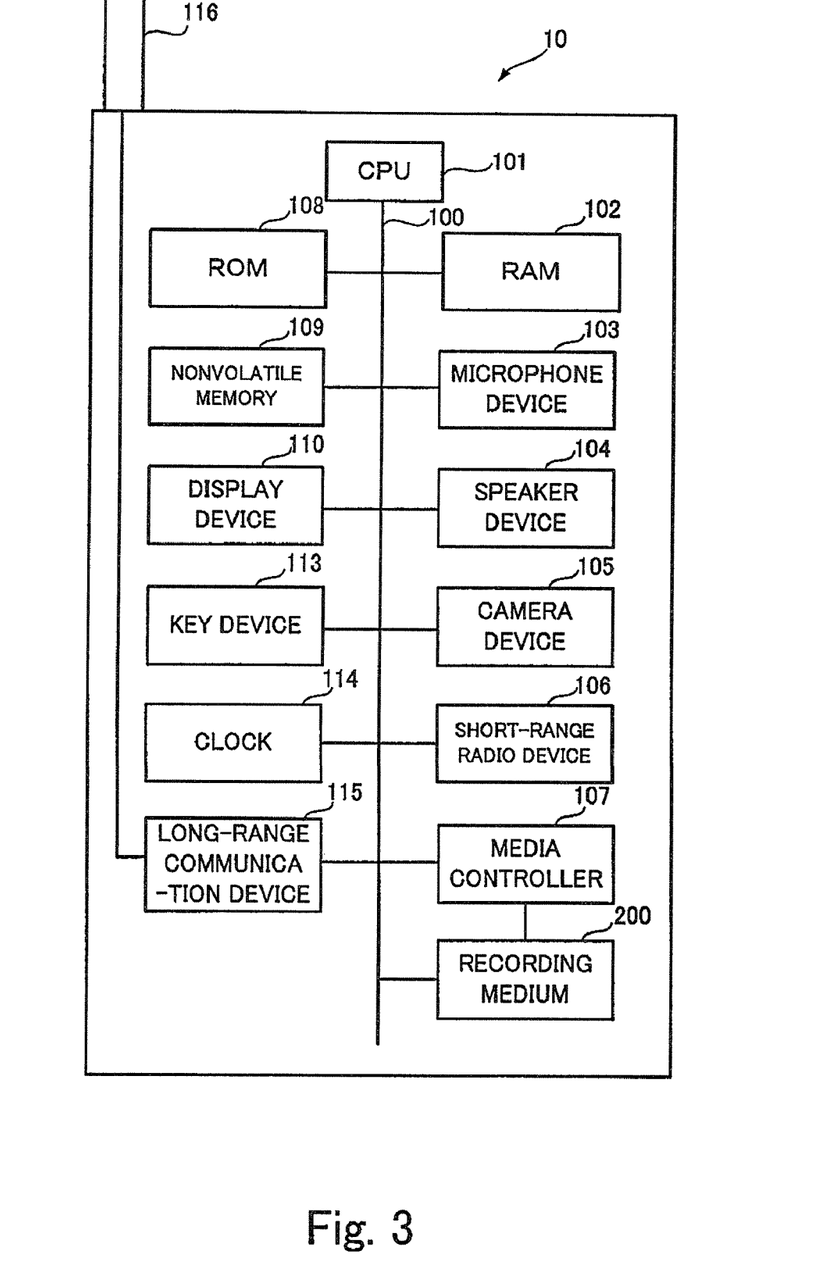
FIG. 3 is a hardware configuration of the portable phone terminal.

FIG. 2 is an external perspective view of the portable phone terminal 10 shown in FIG. 1, and FIG. 3 is a hardware configuration of the portable phone terminal 10.

As shown in FIG. 2, the portable phone terminal 10 has an upper case 11 and a lower case 12 that can be open and closed relative to each other. The upper case 11 has an LCD 111 that displays an image and an earpiece 112 for hearing a voice from a built-in small speaker by being put on an ear of a user.

The lower case 12 has various operation keys 121 operated by a user for making a call or sending an email using the portable phone terminal 10, or conducting various settings. The lower case 12 further has a mouthpiece 122 for guiding a user's voice to a built-in microphone that picks up the voice, a voice output port 123 with a relatively large speaker incorporated therein that outputs a voice large enough to hear without a user's ear being put thereon, and a loading port 124 for loading a recording medium thereon.

FIG. 3 shows a CPU 101, a RAM 102, a microphone device 103, a speaker device 104, a camera device 105, a short-range radio device 106, a media controller 107, a ROM 108, a nonvolatile memory 109, a display device 110, a key device 113, a clock 114, and a long-range communicating device 115. All of these elements are connected to one another via a bus 100. FIG. 3 also shows an antenna 116.

The CPU 101 implements various programs of the portable telephone terminal 10 and controls the whole of the portable telephone terminal 10.

The ROM 108 stores the programs to be implemented by the CPU 101 and various constants required for such implementation. The CPU 101 implements each program stored in the ROM 108 using the RAM 102 as a work area.

The nonvolatile memory 109 stores various data that may be rewritten such as an address book and received emails. The portable telephone terminal 10 has a function of displaying an estrangement list and thereby prevents a communication partner being estranged from the user. The estrangement list is a list of communication partners, out of all the communication partners registered in the address book, whom a user has not contacted for a predetermined period. The details of displaying the estrangement list will be described later.

The microphone device 103 includes a microphone for picking up a user's voice to process the voice picked up by the microphone.

The speaker device 104 includes a speaker to output a voice toward a user and generates a voice signal to drive the speaker.

The short-range radio device 106 is for transmitting an image and a telephone number to an external device at short range without being intervened by a base station, for example, employing an infrared ray.

The camera device 105 collects image data obtained by image-taking operation, the display device 110 serves to display an image on the LCD 111 (see FIG. 2), the key device 113 serves to detect key operation of the keys 121 (see FIG. 2) by the user, and the clock 114 serves to obtain the current time.

The media controller 107 reads data from a recording medium 200 mounted on the loading port 124 shown in FIG. 2 and writes image data generated by the camera device 105 in the recording medium 200.

In addition, the long-range communication device 115 transmits and receives voice data and emails via the antenna 116.

It should be noted here that various programs are installed in the portable telephone terminal 10 via the base station 20. The installed program is stored in the nonvolatile memory 109 and implemented by the CPU 101.

Figure 4:
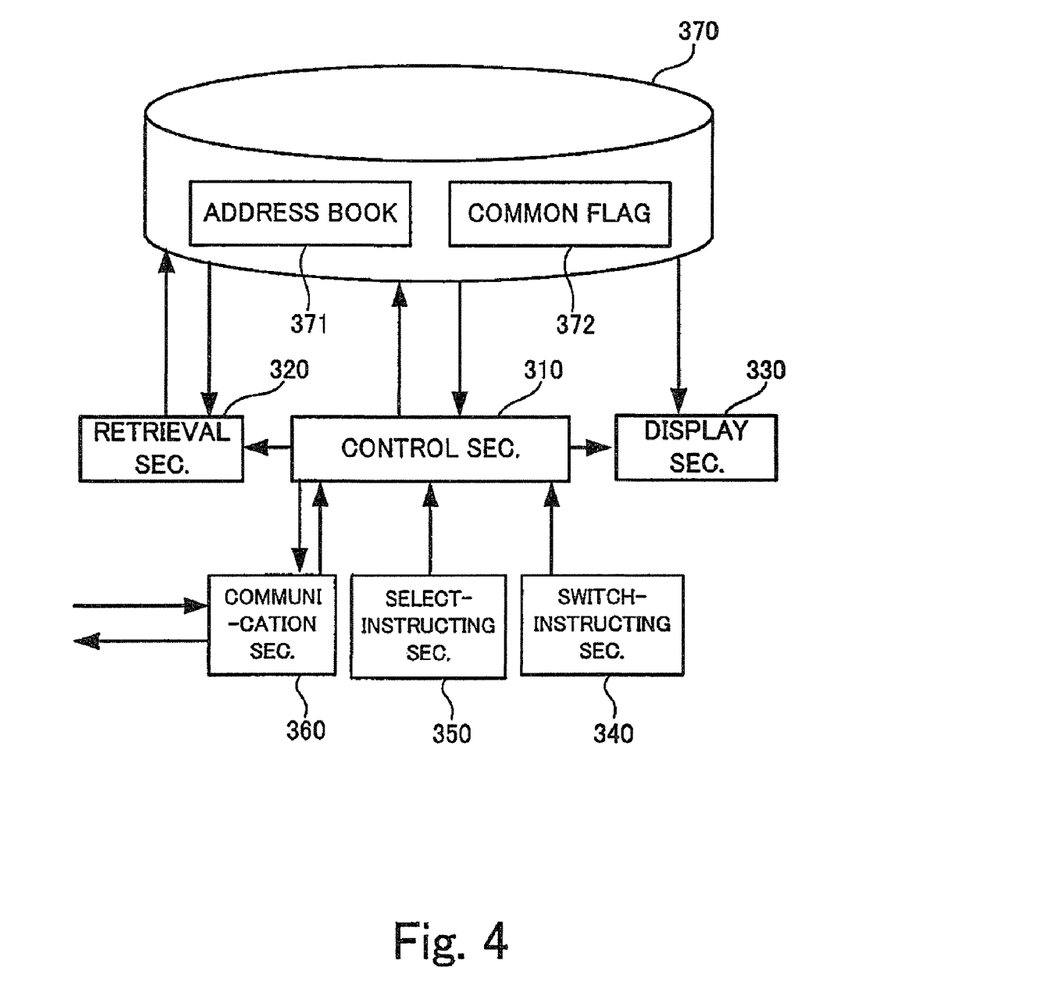
FIG. 4 is a diagram showing functional blocks required to realize a function of displaying an estrangement list.

FIG. 4 shows functional blocks required to realize a function specific to the present embodiment (i.e., displaying an estrangement list), which are configured by hardware of the portable telephone terminal 10 combined with programs implemented by the CPU 101.

FIG. 4 shows a control section 310, a retrieval section 320, a display section 330, a switch-instructing section 340, a select-instructing section 350, a communication section 360, and a memory section 370. All the elements shown in FIG. 4 are controlled by the control section 310.

The function of the memory section 370 is served by the nonvolatile memory 109 shown in FIG. 3. The memory section 370 stores an address book 371 that describes contact addresses such as telephone numbers and email addresses of communication partners and a common flag 372 that is used for implementing a function of displaying an estrangement list.

Table 1 below shows an example of the address book 371 and Table 2 shows an example of the common flag 372.

TABLE 1

| | | Contact address | | Final | | |
| --- | --- | --- | --- | --- | --- | --- |
| No. | Name | Telephone No. | Email address | communication date&time | No. of communications | Estrangement flag |
| 1 | Sawada Kimihiro | 09011111111 | sawa@s.s | 2005/06/15 10:00 | 22 | 1 |
| 2 | Nagasawa Mami | 09022222222 | naga@s.s | 2005/09/29 23:05 | 5 | 0 |

TABLE 1-continued

| | | Contact address | | Final | | |
| No. | Name | Telephone No. | Email address | communication date&time | No. of communications | Estrangement flag |
| --- | --- | --- | --- | --- | --- | --- |
| 3 | Hasegawa Kyoko | 09033333333 | hase@s.s | 2005/08/11 22:33 | 47 | 1 |
| 4 | Fuji Taro | 01144444444 | fuji@s.s | 2005/08/10 12:40 | 23 | 0 |
| ... | ... | ... | ... | ... | ... | ... |
| N | — | — | — | — | — | — |

TABLE 2

| Update time | Automatic display permission flag | Automatic display time | Early display flag | No. of frequent communications | Early display period | Normal display period | Adding flag |
| --- | --- | --- | --- | --- | --- | --- | --- |
| 01:00 | 1 | 12:00 | 1 | 30 | 40 | 90 | 1 |

As shown in Table 1, the address book 371 is formed by: "Number" sequentially assigned to each communication partner; "Name" of a communication partner; "Contact address" including a telephone number and an email address; "Final communication data and time" when a call or an email is finally sent to the corresponding contact address; "Number of communication" or communication frequency with which a call or an email is sent to the corresponding contact address; "Estrangement flag" to indicate whether a period elapsed after the final communication date and time (hereafter referred to as an estrangement period) is equal to or exceeds a predetermined period (1: the estrangement period≧the predetermined period, 0: the estrangement period<the predetermined period, 2: a user instructs deletion of a specific partner). The estrangement flag of the address book 371 is updated by the retrieval section 320 and control section 310.

As shown in Table 2, the common flag 372 is formed by "Update time" that is the time to update the estrangement flag of the address book 371 shown in Table 1; "Automatic display permission flag" to indicate whether automatic display of the estrangement list is permitted (1: automatic display is permitted, 0: automatic display is not permitted); "Automatic display time" to automatically display the estrangement list; "Early display flag" to indicate whether to add to the estrangement list a frequent communication partner whom a user frequently contacts within the predetermined normal period (1: early display is permitted, 0: early display is not permitted); "Number of frequent communication" that is the basis for determining that a partner is a frequent communication partner in the early display; "Early display period" that is a predetermined period for a frequent communication partner for whom early display is permitted; "Normal display period" that is a predetermined period for communication partners other than frequent communication partners; and "Adding flag" that indicates whether a new communication partner is added to the estrangement list (1: a new partner is added, 0: a new partner is not added).

Each time the communication section 360 performs communication, the control section 310 monitors the frequency and date of communication performed and updates relevant flags of the common flag 372 shown in Table 2. Timing to update each flag in Table 2 and display the estrangement list will be described later in detail. The memory section 370 corresponds to an example of the memory section according to the present invention, and the control section 310 corresponds to an example of the frequency acquiring section according to the present invention.

The retrieval section 320 retrieves, from the communication partners registered in the address book 371, a communication partner whose estrangement period is equal to or more than a predetermined period, i.e., the communication partner whom a user has not contacted for a period longer than the predetermined period. The retrieval section 320 corresponds to an example of the retrieval section according to the present invention.

The display section 330 refers to the estrangement flag and final communication date and time in the address book 371 and prepares an estrangement list by arranging the communication partners retrieved by the retrieval section 320 in the order of estrangement period, i.e., the period elapsed after the final communication date and time. Further, the display section 330 displays the prepared estrangement list on the LCD 111. The display section 330 corresponds to an example of the display section according to the present invention.

The function of the switch-instructing section 340 is served by the operation key 121 of FIG. 2 and the key device 113 of FIG. 3. Upon instruction by a user, the switch-instructing section 340 switches the arrangement of communication partners in the estrangement list between ascending order and descending order of the estrangement period. More specifically, a user's instruction for switching is transmitted from the switch-instructing section 340 to the control section 310, which is then transmitted to the display section 330. In the display section 330, the arrangement of communication partners in the estrangement list is switched in accordance with the user's instruction. The switch-instructing section 340 corresponds to an example of the switching section according to the present invention.

The function of the select-instructing section 350 is served also by the operation key 121 of FIG. 2 and the key device 113 of FIG. 3. Upon instruction by a user, the select-instructing section 350 selects a communication partner from the estrangement list. The selected communication partner is transmitted to the control section 310. The control section 310 then acquires the contact address of the selected communication partner transmitted from the select-instructing section 350, transmits the contact address to the communication section 360 and causes the communication section 360 to send a call/email destined for the contact address. Combination of the select-instructing section 350 and the control section 310 corresponds to an example of the communication control section according to the present invention.

The function of the communication section 360 is served by the long-range communication device 115 shown in FIG. 3. The communication section 360 receives voice data and an email destined for the telephone number and the email address owned by the user of the portable telephone terminal 10, and sends voice data and an email destined for a contact address when the contact address is transmitted from the control section 310. When any voice data and email is received or sent by the communication section 360, the control section 310 updates the corresponding final communication date and time, number of communication, and estrangement flag. The communication section 360 corresponds to an example of the communication section according to the present invention.

Basically, the portable telephone terminal 10 is configured as described above.

From now on, the function of displaying the estrangement list that is specific to the present embodiment will be described in detail.

Prior to implementing the function of displaying the estrangement list, the address book 371 in Table 1 and the common flag 372 in Table 2 are registered by a user. The portable telephone terminal 10 is provided with an address book-inputting screen (not shown) for inputting "Name," "Telephone number," and "Email address" in the address book 371 and a common item-setting screen (not shown) for inputting "Update time," "Automatic display permission flag," "Automatic display time," "Early display flag," "Number of frequent communication," "Early display period," and "Normal display period" of the common flag 372. It should be noted that items such as "Final communication date and time," "Number of communication," "Estrangement flag" in the address book 371 and "Adding flag" of the common flag are not registered by the user, but updated by the control section 310 and the like. Initial settings of these items are "Final communication date and time: 00:00," "Number of communication: 0 time," "Estrangement flag: 0 (estrangement period<predetermined period)," and "Adding flag: 0 (no communication partner added in the estrangement list)." The following description will be made, assuming that a user has already registered contact addresses for N communication partners in Table 1 and respective values of items in Table 2.

Figure 5:
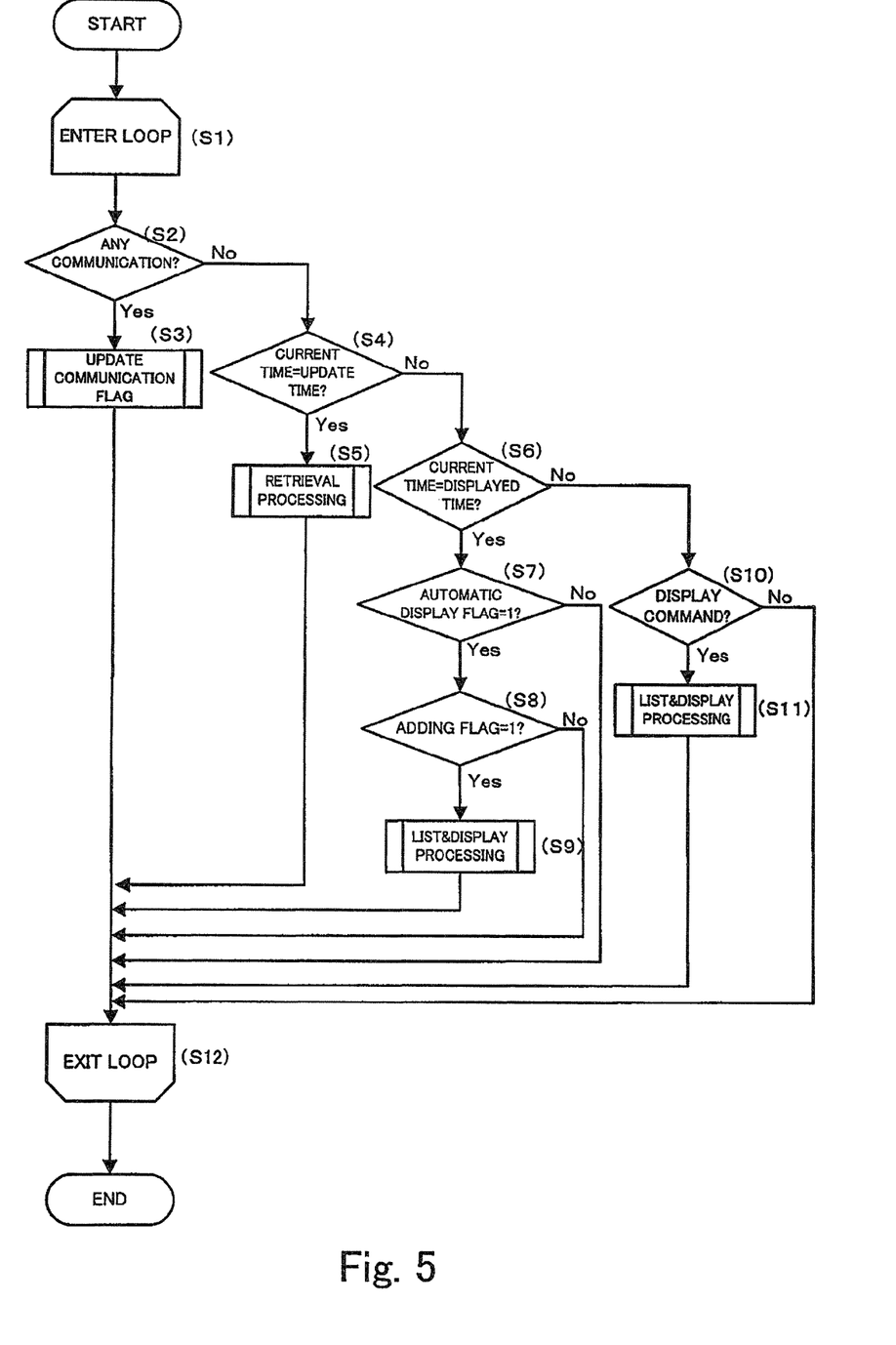
FIG. 5 is a flowchart illustrating a series of processes of displaying the estrangement list.

FIG. 5 is a flowchart illustrating a series of the processes of displaying the estrangement list.

Upon turning-on of the portable telephone terminal 10, following processes (starting from step S1 of FIG. 5) are repeated.

At first, when the communication section 360 shown in FIG. 4 sends voice data and an email to an external device or receives voice data and an email destined for the portable telephone terminal 10 (step S2 of FIG. 5: Yes), the process of updating relevant communication flags is started (step S3 of FIG. 5).

Figure 6:
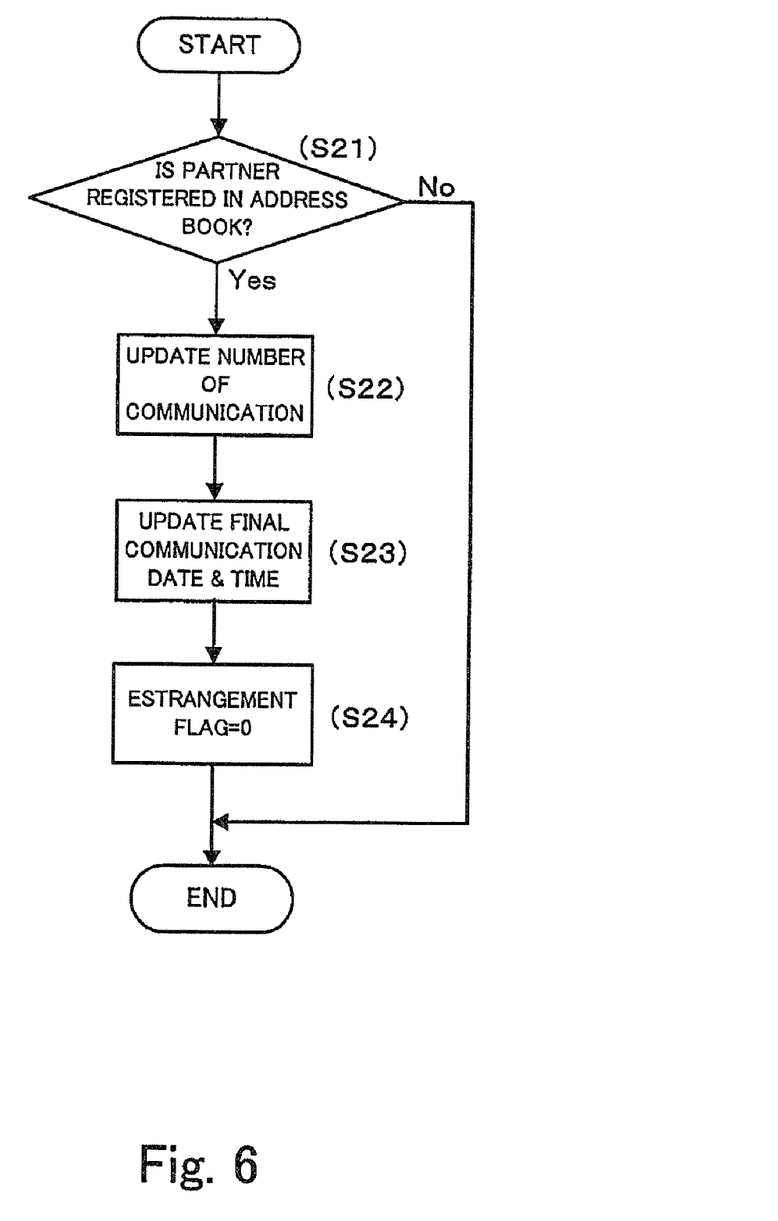
FIG. 6 is a flowchart illustrating a series of processes of updating communication flags.

FIG. 6 is a flowchart indicating a series of processes of updating communication flags shown in step 3 of FIG. 5.

When the communication section 360 receives any data, the communication section 360 acquires an originator address of the received data. When the communication section 360 sends any data, the communication section 360 acquires a recipient address of the sent data. The acquired addresses and the communication date and time of receiving or sending data are transmitted to the control section 310. For example, if the communication section 360 receives an email originated from the email address: sawa@s.s, that email address: sawa@s.s and the date and time when that email was received are transmitted to the control section 310.

The control section 310 checks whether any one of contact addresses registered in the address book 371 shown in Table 1 matches the address acquired by and transmitted from the communication section 360 (step S21 in FIG. 6).

If there is no matched contact address (step S21 of FIG. 6: No), no flag is updated and the process of updating communication flags ends.

If there is any matched contact address (step S21 of FIG. 6: Yes), the control section 310 adds "one" to the number of communications for the matched contact address in the address book 371 (step S22 of FIG. 6), and the final date and time for the matched contact address is updated to the date and time when the matched contact address is transmitted from the communication section 360 (step S23 of FIG. 6). Further, the estrangement flag for the matched contact address in the address book 371 is rewritten to 0: estrangement period<predetermined period (step S24 of FIG. 6). In this example, when the control section 310 receives the email address: sawa@s.s and the date and time when that email was received, the control section 310 checks whether any of contact addresses registered in the address book 371 matches the email address: sawa@s.s. According to Table 1, the contact address for the communication partner to which the number "1" is assigned (hereafter referred to as No. 1 communication partner) matches the received contact address. Thus, the final communication date and time for the No. 1 communication partner is rewritten to the date and time when the matched contact address was received from the communication section 360, "one" is added to the number of communications, and the estrangement flag is rewritten to "0."

The above processes of updating the communication flags are preparations for displaying the estrangement list, and repeated each time data is received from or sent to an external device.

Further, in the flowchart of FIG. 5, when the current time obtained by the clock 114 shown in FIG. 3 reaches the update time registered in the common flag 372 (step S4 in FIG. 5: Yes), the process of retrieving a communication partner whom a user has not contacted for a predetermined period or more is started (step S5 of FIG. 5).

Figure 7:
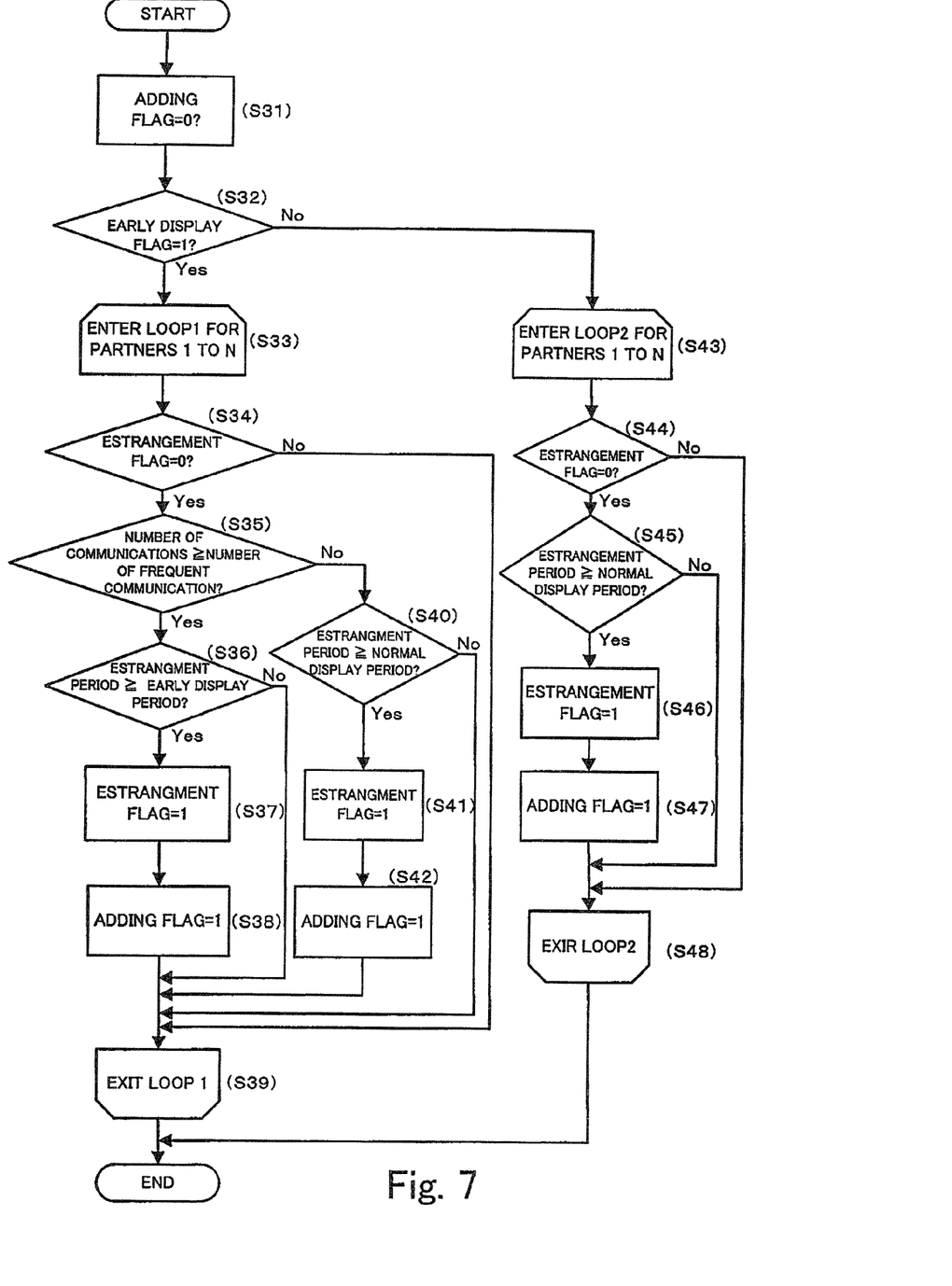
FIG. 7 is a flowchart illustrating a series of retrieval processes.

FIG. 7 is a flowchart illustrating in details a series of retrieval processes shown in step S5 in FIG. 5.

At first, the control section 310 initializes the adding flag of the common flag 372 in Table 2 by rewriting the adding flag to "0: a new partner is not added to the estrangement list)" (step S31 in FIG. 7).

Subsequently, depending on whether the value of the early display flag of the common flag 372 is "1: early display is permitted," the following retrieval process is performed in the retrieval section 320.

When early display flag=1 (step S32 of FIG. 7: Yes), it means that the early display is permitted and a frequent communication partner is added to the estrangement list based on the predetermined earlier display period. Thus, the predetermined period for each of the communication partners in the address book 371 shown in Table 1 is changed based on the number of communications. The process of retrieval is performed based on the changed predetermined period (step S33 of FIG. 7).

The process of retrieval starts with checking the estrangement flag for the communication partner No. 1 registered in the address book 371. If the estrangement flag has either value of 1 or 2, in other words, the value other than "0: estrangement period<the predetermined time" (step S34 of FIG. 7: No), this means that the communication partner is already included in the estrangement list (estrangement list: 1) or is deleted from the estrangement list by the instruction of a user (estrangement list: 2). Accordingly, the retrieval process for the communication partner ends here, and goes on to the next communication partner No. 2.

On the other hand, if the estrangement flag has the value "0: estrangement period<the predetermined time" (step S34 of FIG. 7: Yes), it is checked whether the communication partner is a frequent communication partner. If the number of communications for the communication partner in the address book 371 is equal to or more than the number of frequent communication (step S35 of FIG. 7: Yes), the communication partner is judged to be a frequent communication partner and a predetermined display period for the communication partner is determined to be the early display period in the common flag 372.

Subsequently, an estrangement period which is a period elapsed after the final communication date and time in the address book 371 is calculated, and it is checked whether the calculated estrangement period is equal to or longer than the predetermined early display period. If the calculated estrangement period is shorter than the predetermined early display period (step S36 of FIG. 7: No), it means that a user contacted the communication partner within the predetermined early display period. Accordingly, the retrieval process for the communication partner ends here and goes to the next communication partner.

On the other hand, if the calculated estrangement period is equal to or longer than the predetermined early display period (step S36 of FIG. 7: Yes), it means that a user has not contacted the communication partner for a period longer than the predetermined early display period. Accordingly, the estrangement flag of the address book 371 is changed to 1: estrangement period≧the predetermined time (step S37 of FIG. 7) and the adding flag of the common flag 372 is changed to 1: a new communication partner is added (step S38 of FIG. 7).

Further, if the number of communications for the communication partner in the address book 371 is lower than the number of frequent communication (step S35 of FIG. 7: No), the communication partner is determined to be a normal communication partner and a predetermined period for the communication partner is set to be the normal display period in the common flag 372. Subsequently, similarly to steps S36 to S38, an estrangement period elapsed after the final communication date and time is calculated. If the calculated estrangement period is shorter than the predetermined normal display period (step S40 of FIG. 7: No), the retrieval process for this communication partner ends and that for the next communication partner starts. If the calculated estrangement period is equal to or longer than the predetermined normal display period (step S40 of FIG. 7: Yes), the estrangement flag for the communication partner of the address book 371 is changed to 1: estrangement period≧the predetermined time (step S41 of FIG. 7) and the adding flag of the common flag 372 is changed to 1: a new communication partner is added (step S42 of FIG. 7).

The processes from steps S34 to S42 are repeated (step S39 of FIG. 7) for No. 1 to No. N communication partners listed in the address book 371 shown in Table 1.

Alternatively, if the early display flag of the common flag 372 has the value of 0: early display is not permitted (step S32 of FIG. 7: No), the normal display period of the address book 371 is uniformly assigned to all of No. 1 to No. N communication partners irrespective of the number of communications and the retrieval processes is started (step S43 of FIG. 7).

Also in the case where early display is not permitted, similarly to the processes in steps S34, S40 to S42, the retrieval process for each communication partner registered in the address book 371 is completed when the corresponding estrangement flag is 0: the estrangement period<the predetermined time (step S44 of FIG. 7: No). Subsequently, the retrieval process for the next communication partner starts. Alternatively, the corresponding estrangement flag is 1: the estrangement period≧the predetermined time (step S44 of FIG. 7: Yes), the estrangement period is calculated based on the final communication date and time in the address book 371. If the calculated estrangement period is shorter than the predetermined period (normal predetermined period) (step S45 of FIG. 7: No), the retrieval process for the communication partner ends and that for the next communication partner starts. If the calculated estrangement period is equal to or longer than the predetermined normal period (step S45 of FIG. 7: Yes), the estrangement flag of the address book 371 is changed to 1: the estrangement period≧the predetermined time (step S46 of FIG. 7) and the adding flag of the common flag 372 is changed to 1: a new partner is added (step S47 of FIG. 7).

The above processes of S44 to S47 are repeated for the communication partners "No. 1" to "No. N" registered in the address book 371 of Table 1 (step S48 in FIG. 7).

For example, when the retrieval process is performed in the initial state for each of the communication partner No. 1 to No. 4 registered in the address book 371 in Table 1, the adding flag shown in Table 2 is set to 0 (step S31 of FIG. 7). Subsequently, as the early display flag of the common 372 is set to "1" as shown in Table 2 (step S32 of FIG. 7), the processes from step S33 are repeated.

At first, the estrangement flag for the communication partner No. 1 in the initial state is set to 0 (step S34 of FIG. 7: Yes), and the number of communications is "22" that is smaller than 30: the number of frequent communications of the common flag 372 (step S35 of FIG. 7). Thus, a predetermined period for the communication partner No. 1 is set to the normal display period of "90 days" shown in Table 2. Subsequently, an estrangement period is calculated based on the corresponding final communication date and time "2005/06/15 10:00" of the address book 371 and compared with the normal display period of 90 days. If the current time is, for example, "2005/09/30 01:00," the calculated estrangement period is longer than the normal display period of "90 days" (step S40 of FIG. 7: Yes). Thus, the estrangement flag of the address book 371 is changed to 1: the estrangement period 2 the predetermined time (step S46 of FIG. 7) and the adding flag of the common flag 372 is changed to 1: a new partner is added (step S47 of FIG. 7).

Next, the retrieval process for the communication partner No. 2 starts similarly to the communication partner No. 1. The estrangement flag in the initial state is set to 0 (step S34 of FIG. 7: Yes), and the number of communications is "5" that is smaller than 30: the number of frequent communications of the common flag 372 (step S35 of FIG. 7). Thus, a predetermined period for the communication partner No. 2 is set to the normal display period of "90 days." As the estrangement period calculated based on the corresponding final communication date and time "2005/09/29 23:05" of the address book 371 and the current time "2005/09/30 01:00" is shorter than the normal display period of "90 days" (step S40 of FIG. 7: No), neither of the estrangement flag nor the adding flag is changed and the retrieval process goes to the communication partner No. 3.

Similarly, the estrangement flag for the communication No. 3 in initial state is set to 0 (step S34 of FIG. 7: Yes), and the number of communications is "47" that is larger than the number of frequent communications (step S35 of FIG. 7: Yes). Thus, a predetermined period for the communication partner No. 3 is set to the early display period of "40 days." As the estrangement period calculated based on the corresponding final communication date and time "2005/08/11 23:33" of the address book 371 and the current time "2005/09/30 01:00" is longer than the early display period of "40 days" (step S36 of FIG. 7: Yes), the estrangement flag is changed to 1: (step S37 of FIG. 7) and the adding flag is changed to 1: a new partner is added (step S38 of FIG. 7).

Next, the retrieval process goes to the communication No. 4. Similarly to the communication partner No. 1, the estrangement flag of the communication partner No. 4 in initial state is set to 0 (step S34 of FIG. 7: Yes), and the number of communications is "23" that is smaller than the number of frequent communications of "30" (step S35 of FIG. 7: No). Thus, a predetermined period for the communication partner No. 4 is set to the normal display period of "90 days." As the estrangement period calculated based on the corresponding final communication date and time "2005/08/10 12:40" and the current time "2005/09/30 01:00" is shorter than the normal display period of "90 days" (step S40 of FIG. 7: Yes), neither the estrangement flag nor the adding flag is changed and the retrieval process for this communication partner ends.

According to the example shown in Table 1, the communication partner No. 4 is not added to the estrangement list (estrangement flag: 0) while the communication partner No. 3, the final date and time of which is later than that of the communication partner No. 4 but the estrangement period of which is longer than that of the communication partner No. 4, is added to the estrangement list (estrangement flag: 1). In this way, by adding a frequent communication partner to the estrangement list within a shorter predetermined period, it is possible to avoid a situation in which a user may be estranged from the frequent communication partner.

The above retrieval process is repeated at every predetermined update time.

Further, when the current time obtained from the clock 114 shown in FIG. 3 reaches the automatic display time set in the common flag 372 (step S6 of FIG. 5: Yes), it is determined whether automatic display to display an estrangement list is permitted (step S7 of FIG. 5).

In the case where automatic display flag of the common flag 372 is set to 1: automatic display is permitted (step S7 of FIG. 5: Yes), automatic display is permitted. Subsequently, it is determined whether a new communication partner to be added to an estrangement list is retrieved (step S8 of FIG. 5). Only when such a new communication partner is retrieved, the estrangement list is displayed, which eliminates the need to confirm the same estrangement list each time in retrieval process.

When the adding flag of the common flag 372 is set to 1: 1: a new partner is added (step S8 of FIG. 5: Yes), the listing and displaying process in which an estrangement list is created and displayed is performed (step S9 of FIG. 5).

Figure 8:
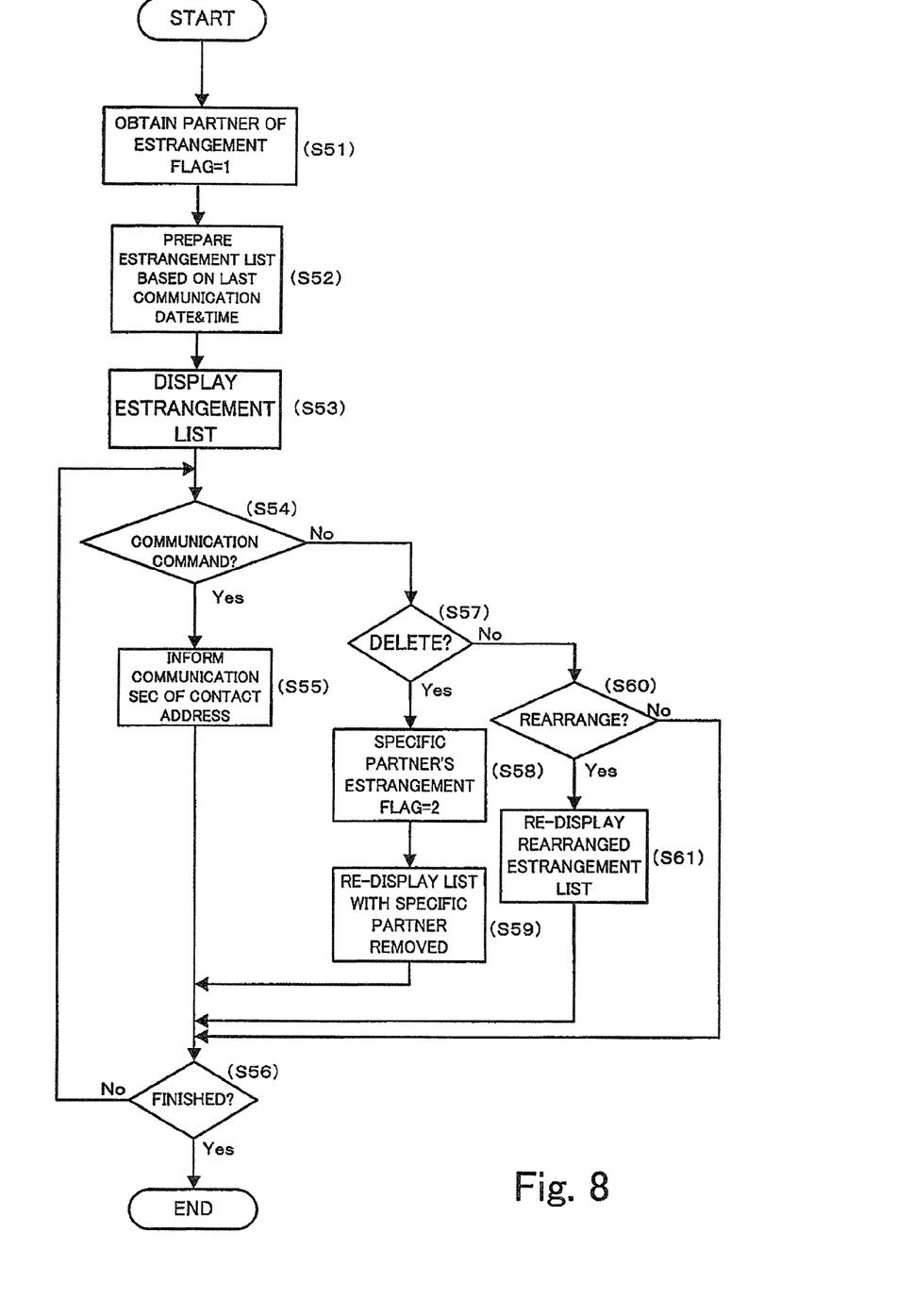
FIG. 8 is a flowchart illustrating a series of the processes of displaying a list.

FIG. 8 is a flowchart illustrating the listing and displaying process in step S9 of FIG. 5.

The display section 330 shown in FIG. 4 retrieves from the communication partners registered in the address book 371 a communication partner whose estrangement flag is 1: the estrangement period≧the predetermined time (step S51 of FIG. 8) and obtains the final communication date and time for the retrieved communication partner.

Further, the display section 330 arranges the retrieved communication partners in the order of the latest to earlier final communication date and time (i.e., the increasing order of length of estrangement period) to prepare an estrangement list (step S52 of FIG. 8). The prepared list is displayed on the LCD 111 shown in FIG. 2 by way of the display device 110 shown in FIG. 3 (step S53 in FIG. 8). According to the example shown in Table 1, an estrangement list is prepared in which the communication partners No. 1 and No. 3 whose estrangement flag is 1 are arranged.

Figure 9:
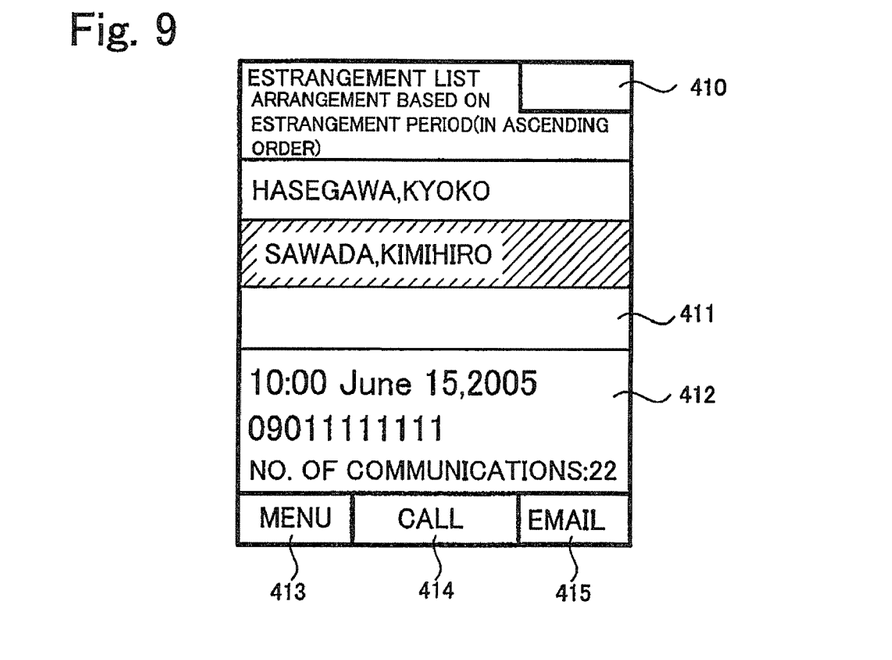
FIG. 9 is an example of the estrangement list.

FIG. 9 is an example of an estrangement list displayed on the LCD 111.

An estrangement list 410 has: a communication partner display section 411 to display retrieved communication partners so as to be selected; a communication information display section 412 to display date and time of the final communication with the selected communication partner, the contact information of the final communication, and the number of communications with the selected communication partner; a menu button 413 to display a list menu (refer to FIG. 10); a calling button 414 to make a call to the phone number of the communication partner selected in the communication partner display section 411; and an Email button 414 to create an email destined for the email address of the communication partner selected in the communication partner display section 411. According to the example shown in FIG. 9, the names of the communication partners No. 1 and No. 3 of the address book 371 in Table 1 are displayed in the order of the latest to earlier final communication date and time, that is, the communication partner No. 3 in the first row and the communication partner No. 1 in the second row. In this example, the communication partner No. 1 is selected. Further, the date and time of final communication, its phone number, and the number of communications with the communication partner No. 1 are displayed in the communication information display section 412.

A user is to select, from the communication partners displayed on the communication partner display section 411, a communication partner whom the user wishes to contact, using the operation keys 121 shown in FIG. 2. Then, if the user selects either of the call button 414 and the email button 414 (step S554 of FIG. 8: Yes), the selected communication partner and the communication means (phone/email) selected by either of the call button 414 and the email button 414 are conveyed from the select-instructing section 350 to the control section 310 in FIG. 4.

The control section 310 refers to the address book 371 and transmits to the communication section 360 the contact address of the conveyed communication partner (step S55 of FIG. 8). For example, if an email is selected as a communication means, the email address of the conveyed communication partner is transmitted to the communication section 360.

The communication section 360 transmits data destined for the contact information that is conveyed from the control section 310. Specifically, if a phone number is conveyed, the communication section 360 sends a call request to a telephone terminal with the conveyed phone number assigned thereto and make a call. Alternatively, if an email address is conveyed, the communication section 360 causes an email creation tool provided in the portable phone terminal 10 to set an email address to the conveyed email address. After the user edits context of an email and instructs transmission of the email, the email with the edited text is transmitted to the set email address.

As described above, according to the portable phone terminal 10 of the present embodiment, the estrangement list to display communication partners whom a user has not contacted for a predetermined period or more is displayed. Thus, the user can easily select and contact any communication partner from the estrangement list without referring by herself/himself to the address book 371 for the contact information of a communication partner whom the user has not contacted and wishes to contact. Accordingly, it is possible to avoid a situation in which a user may be estranged from a communication partner.

Alternatively, if the user selects the menu button 413 shown in FIG. 9 using the operation keys 121 in FIG. 2, the list menu is displayed.

Figure 10:
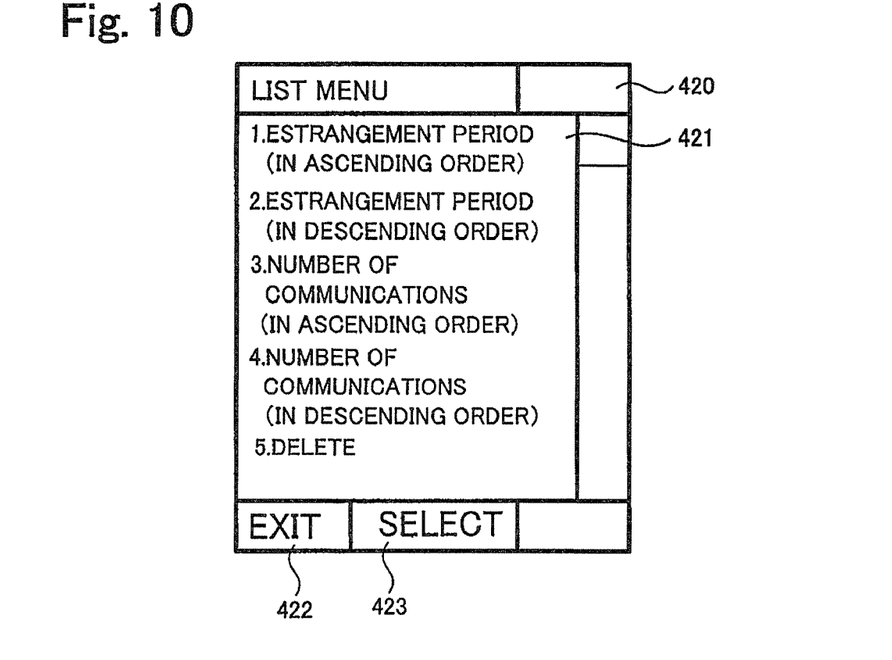
FIG. 10 is an example of a list menu.

FIG. 10 shows an example of the list menu displayed on the LCD 111.

The list menu 420 shown in FIG. 10 has a process-selecting section 421 to select a process of the estrangement list 410 shown in FIG. 9, an exit button 422 to close the list menu 420, a select button 423 to implement the process selected by the process-selecting section 421. According to the example shown in FIG. 10, it is possible, using the list menu 420, to select a process from the processes of "1. Arrange the communication partners in the estrangement list in ascending order of the estrangement period," "2. Arrange the communication partners in the estrangement list in descending order of the estrangement period," "3. Arrange the communication partners in the estrangement list in ascending order of communication frequency," "4. Arrange the communication partners in the estrangement list in descending order of communication frequency," and "5. Delete the selected communication partner from the estrangement list."

For example, if the user selects, using the operation keys 121 in FIG. 2, selects a communication partner whom the user wishes to delete from the communication partners in the estrangement list 410, and then selects "5. Delete" from the process-selecting section 421 (step S57 of FIG. 8), the selected communication partner and the instruction for deletion are conveyed from the switch-instructing section 340 to the control section 310. The control section 310 changes the estrangement flag of the conveyed communication partner to "2: delete the selected communication partner" (step S58 of FIG. 8), and conveys the communication partner and the instruction of deletion to the display section 330. The display section 330 deletes the conveyed communication partner from the estrangement list 410 and displays a new estrangement list on the LCD 111 (step S59 of FIG. 8).

Alternatively, if the user uses the operation keys 121 shown in FIG. 2 to display the list menu 420 and selects a process of arranging the communication partners in the estrangement list from the processes 1. to 4. in the process-selecting section 421 (step S60 of FIG. 8), the number of the selected process is conveyed from the switch-selecting section 340 to the control section 310.

The control section 310 conveys the number of the selected process to the display section 330 which in turn rearranges the communication partners in the estrangement list 410 according to the selected process and displays a new estrangement list on the LCD 111 (step S61 of FIG. 8).

In this way, it is possible to enhance operability of the portable phone terminal 10 by rearranging the communication partners of the estrangement list to suit the need of a user.

The above processes of step S54 to step S61 are repeated until the user closes the estrangement list (step S56 of FIG. 8).

In addition, the above process of displaying the estrangement list is performed not only at automatic display time but also at a time when displaying the list is instructed by a user by using the operation keys 121 in FIG. 2 (step S10, step S11 in FIG. 5).

As described above, the processes of step S2 to step S11 in FIG. 5 are repeated until the user turns off the portable phone terminal 10 (step S12 of FIG. 5).

Incidentally, in the example described above, the present invention is applied to the portable phone terminal 10, but the present invention may be also applied to a fixed telephone terminal or a computer or the like.

In addition, in the example described above, telephone numbers and email addresses are registered in the address book as contact information, but facsimile numbers or addresses may also be registered in the address book in addition to telephone numbers and email addresses.

The invention claimed is:

1. A communication apparatus comprising:
   a memory section that stores a correspondence table associating users of external communication apparatuses with contact addresses for contacting the users via the communication apparatus;
   a communication section that transmits data destined for the contact addresses and/or receives data originated from the contact addresses;
   a retrieval section that retrieves, from the users in the correspondence table stored in the memory section, users with an elapsed period longer than a threshold value, the elapsed period being a period elapsed after a final communication destined for or originated from contact addresses of the retrieved users;
   a display section that displays a list of the users retrieved by the retrieval section; and
   a communication control section that, in response to operation of selecting a user from the list displayed by the display section, causes the communication section to perform a communication destined for the contact address associated with the selected user and registered in the correspondence table,
   wherein the display section displays the list of the users retrieved by the retrieval section in the order according to the elapsed period, and
   the communication apparatus further comprises a switching section that switches, according to instruction, arrangement of the users in the list between ascending order and descending order.

2. The communication apparatus according to claim 1, wherein the retrieval section retrieves users with the elapsed period longer than the threshold value at every predetermined timing, and
   the display section displays a list including a new user, when the new user is retrieved who is other than the users previously retrieved and displayed in the display section.

3. The communication apparatus according to claim 1, further comprising:
   a frequency acquiring section that acquires the number of communications, for each of the users in the correspondence table, which are performed by the communication section and destined for or originated from the contact address associated with the user,
   wherein the retrieval section changes the threshold value to a value smaller as the acquired number of communications is larger, and retrieves a user with the elapsed period longer than the changed threshold value.

4. A non-transitory communication program storage medium storing a communication program that is implemented in a program-executable communication apparatus and causes the communication apparatus to construct:
   a memory section that stores a correspondence table associating users of external communication apparatuses with contact addresses for contacting the users via the communication apparatus;

a communication section that transmits data destined for the contact addresses and/or receives data originated from the contact addresses;

a retrieval section that retrieves, from the users in the correspondence table stored in the memory section, users with an elapsed period longer than a threshold value, the elapsed period being a period elapsed after a final communication destined for or originated from contact addresses of the retrieved users;

a display section that displays a list of the users retrieved by the retrieval section; and a communication control section that, in response to operation of selecting a user from the list displayed by the display section, causes the communication section to perform a communication destined for the contact address associated with the selected user in the correspondence table, wherein the display section displays the list of the users retrieved by the retrieval section in the order according to the elapsed period, and the communication apparatus further comprises a switching section that switches, according to instruction, arrangement of the users in the list between ascending order and descending order.

5. A communication method of a communication apparatus that transmits and/or receives data, the method comprising the steps of:

storing a correspondence table associating users of external communication apparatuses with contact addresses for contacting the users via the communication apparatus; retrieving, from the users in the correspondence table stored in the memory section, users with an elapsed period longer than a threshold value, the elapsed period being a period elapsed after a final communication destined for or originated from contact addresses of the retrieved users;

displaying a list of the retrieved users; and in response to operation of selecting a user from the list displayed by the display section, performing a communication destined for the contact address associated with the selected user in the correspondence table, wherein the display section displays the list of the users retrieved by the retrieval section in the order according to the elapsed period, and the communication apparatus further comprises a switching section that switches, according to instruction, arrangement of the users in the list between ascending order and descending order.

* * * * *